United States Patent
Kyung et al.

(10) Patent No.: US 8,824,004 B2
(45) Date of Patent: Sep. 2, 2014

(54) IMAGE FORMING APPARATUS CONTROLLING PERFORMANCE OF A FUNCTIONAL PRINTING AND IMAGE FORMING METHOD THEREOF

(75) Inventors: Myung-ho Kyung, Suwon-si (KR); Jeong-hwan Kim, Gunsan-si (KR); Byoung-chul Bae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 496 days.

(21) Appl. No.: 13/137,219

(22) Filed: Jul. 28, 2011

(65) Prior Publication Data

US 2012/0113442 A1   May 10, 2012

(30) Foreign Application Priority Data

Nov. 9, 2010   (KR) .................. 10-2010-0111151

(51) Int. Cl.
   *H04N 1/60*      (2006.01)
   *H04N 1/50*      (2006.01)

(52) U.S. Cl.
   CPC .................................... *H04N 1/506* (2013.01)
   USPC ............. 358/1.9; 358/498; 399/34; 399/37; 399/71; 399/123; 399/149; 399/326; 399/327; 399/343; 399/345; 399/350; 399/396; 399/98

(58) Field of Classification Search
   CPC ...................................................... H04N 1/506
   USPC ......... 358/1.9, 498; 399/34, 37, 71, 123, 149, 399/326, 327, 343, 345, 350, 354, 396, 98
   See application file for complete search history.

(56) References Cited

U.S. PATENT DOCUMENTS

| | | | | |
|---|---|---|---|---|
| 5,797,080 A * | 8/1998 | Okamoto | ....................... | 399/391 |
| 6,078,761 A * | 6/2000 | de Waal | .......................... | 399/61 |
| 6,712,464 B1 * | 3/2004 | Minami et al. | ................ | 347/107 |
| 7,653,329 B2 * | 1/2010 | Sasai | .............................. | 399/127 |
| 7,869,751 B2 * | 1/2011 | Adachi et al. | ................ | 399/316 |
| 2001/0053294 A1 * | 12/2001 | Yamada et al. | ................ | 399/66 |
| 2006/0269301 A1 * | 11/2006 | Ogasawara | ..................... | 399/21 |
| 2010/0316397 A1 * | 12/2010 | Kudou et al. | ................... | 399/43 |
| 2010/0328718 A1 * | 12/2010 | Takahashi | .................... | 358/1.15 |
| 2011/0064440 A1 * | 3/2011 | Saitoh | ............................. | 399/69 |

FOREIGN PATENT DOCUMENTS

JP   08-211808   8/1996

* cited by examiner

*Primary Examiner* — Benny Q Tieu
*Assistant Examiner* — Quyen V Ngo
(74) *Attorney, Agent, or Firm* — Staas & Halsey LLP

(57) ABSTRACT

An image forming apparatus and method are provided. The image forming apparatus includes a communication interface unit that receives printing data, an image forming unit that performs an ordinary printing to form an image on printing paper based on the printing data, a paper supplying unit that provides the printing paper to the image forming unit along with a paper supplying route, a determination unit that determines whether a functional printing may be performed on the paper supplying route in an interval section between sheets of the printing paper, and a controller that controls the image forming unit to perform a functional printing, wherein the ordinary printing is a printing performed on one or more sheets of printing paper, and the functional printing is a printing performed in an interval section between the sheets of printing paper.

16 Claims, 8 Drawing Sheets

| EP PROCESS | | ORDINARY MODE | | | | SPECIAL MODE | | |
|---|---|---|---|---|---|---|---|---|
| FUNCTION | MEANS | (IMAGE FORMING AREA) | (NON-IMAGE FORMING AREA) | | (IMAGE FORMING AREA) | (NON-IMAGE FORMING AREA) | | (IMAGE FORMING AREA) |
| | | PRINTING PAPER | INTERVAL BETWEEN PRINTING PAPERS | | PRINTING PAPER | INTERVAL BETWEEN PRINTING PAPERS | | PRINTING PAPER |
| FORMING ELECTRIC POTENTIAL@OPC | CHARGING(CR) | ON | ON | MAINTAINING OPC OPERATION CONSTANTLY | ON | ON | MAINTAINING OPC OPERATION CONSTANTLY | ON |
| FORMING EXPOSURE POTENTIAL@OPC | EXPOSING(LSU) | ON | OFF | (-)TONER CONTAMINATION OCCURS FREQUENTLY | ON | ON | (-)TONER CONTAMINATION OCCURS FREQUENTLY && CONTAMINATION ON FUNCTIONAL IMAGE OCCURS IN CONDITION UNIT | ON |
| FORMING TONER IMAGE@OPC | DEVELOPING (DEVE) | ON | OFF | | ON | ON | | ON |
| FORMING NON-FIXING IMAGE@PRINTING PAPER | TRANSFERRING (TR) | ON | ON | PREVENTING TR FROM BEING CONTAMINATED DUE TO (-)TONER | ON THV[+] | ON | PREVENTING TR FROM BEING CONTAMINATED DUE TO (-)TONER AND FUNCTIONAL IMAGE | ON |
| TIMING OF PAPER RETURN | PICK-UP CLUTCH (OR FEED CLUTCH) (OR REGI CLUTCH) | DEFAULT | DEFAULT | | DEFAULT | DEFAULT | [OPTIONAL] PERFORMING DELAY | DEFAULT |

FIG. 8

IMAGE FORMING APPARATUS CONTROLLING PERFORMANCE OF A FUNCTIONAL PRINTING AND IMAGE FORMING METHOD THEREOF

CROSS-REFERENCE TO RELATED APPLICATIONS

This application claims the priority benefit under 35 U.S.C. §119 of Korean Patent Application No. 10-2010-0111151, filed on Nov. 9, 2010, in the Korean Intellectual Property Office, the disclosure of which is incorporated herein by reference.

BACKGROUND

1. Field

Exemplary embodiments of the disclosure herein relate to an image forming apparatus and an image forming method thereof, and more particularly, provide an image forming apparatus capable of making an interval between printing papers, and an image forming method thereof.

2. Description of the Related Art

An image forming apparatus is an apparatus for printing data from a terminal apparatus such as a computer on printing paper. Examples of the image forming apparatus include copiers, printers, facsimiles and Multi Function Peripherals (MFP), which can integrate functions of, for example, the aforementioned apparatuses in a single apparatus.

There is a growing trend towards increasing a number of pages output per minute by the image forming apparatuses to satisfy the high-speed engine quality thereof. However, the engine has a limitation in performing its' internal process for a high speed rotation, so most of the image forming apparatuses have a short interval distance between the sheets of printing paper.

However, if an interval distance between the sheets of printing paper is too short, there may not be enough time to form a transfer roller cleaning blade protective line or to discharge a heated toner during the interval between the sheets of printing paper, resulting in a contamination of the sheets of printing paper.

SUMMARY

Aspects of an exemplary embodiment relate to an image forming apparatus configured to obtain an interval between sheets of printing paper by delaying a supply of the sheets of printing paper, upon a functional printing being required during an image forming process for printing data, and an image forming method thereof.

According to an exemplary aspect, an image forming apparatus is provided including a communication interface unit that receives printing data, an image forming unit which performs printing to form an image on one or more sheets of printing paper based on the printing data, a paper supplying unit that supplies the printing paper to the image forming unit along with a paper supplying route, a determination unit that determines whether a functional printing may be performed on the paper supplying route in an interval section between the sheets of printing paper, and a controller that controls the image forming unit to perform a printing, upon determining that a functional printing is required, wherein the ordinary printing is a printing performed on one or more sheets of printing paper, and the functional printing is a printing performed in an interval section between the sheets of printing paper, and the controller controls, the paper supplying unit to obtain a predetermined interval between the sheets of printing paper for a functional printing by delaying the supply of the sheets of printing paper, if it is determined that the functional printing cannot be performed in the interval section between the sheets of printing paper.

An exemplary embodiment of a functional printing is at least one printing among a toner line printing for adjusting the toner concentration, a toner line printing for preventing a cleaning blade of a photosensitive medium from being turned over, a toner line printing for preventing a cleaning blade of a transfer belt from being turned over and a printing for discharging a heated and pressurized toner.

An exemplary embodiment of a paper supplying unit includes a pick-up clutch supplying a printing paper from a printing paper tray onto the paper supplying route, a registration clutch supplying the sheets of printing paper to the image forming unit, and a feed clutch supplying the printing paper from the pick-up clutch to the registration clutch, wherein the controller delays the operation start time of at least one clutch among the pick-up clutch, the registration clutch, and the feed clutch to obtain a longer interval between the sheets of printing paper than a predetermined interval.

An exemplary embodiment of a predetermined interval between the sheets of printing paper is 1 to 1.4 times of the circumference of the transfer roller.

An exemplary embodiment of an image forming unit may includes a photosensitive medium, an exposing unit which forms an electrostatic latent image corresponding to the printing data on the photosensitive medium, a developing unit which develops the electrostatic latent image as a developing material, and a transferring unit which transfers the developed developing material on the printing paper.

The image forming unit may form a toner line in the interval section between the sheets of printing paper, if a functional printing is required.

The controller may apply to the transferring unit an identical polarity voltage to that of the toner when the toner line passes by the transferring unit.

The controller may apply to the transferring unit an opposite polarity voltage compared to a voltage applied to the transferring unit after the toner line passes by the transferring unit and a predetermined time is passed.

The controller may apply to the transferring unit an opposite polarity and an identical polarity, alternately, to that of the voltage applied to the transferring unit after the toner line passes by the transferring unit and a predetermined time is passed.

The exposing unit and the developing unit may be inactivated in the interval section between the sheets of printing paper, if a functional printing is not required, and maintain the activation in the interval section between the sheets of printing paper, if a functional printing is required.

According to an exemplary aspect, an image forming method of an image forming apparatus is provided, the method including receiving a printing data; performing an ordinary printing to form an image on a printing paper based on the printing data; determining whether a functional printing may be performed on a paper supplying route in an interval section between the sheets of printing paper; supplying the printing paper after a preset delay time to obtain a predetermined interval between the sheets of printing paper for the functional printing; and performing a functional printing in the interval section between the sheets of printing paper on the paper supplying route, wherein the ordinary printing is a printing performed on the printing a paper, and the functional printing is a printing performed in an interval section between the sheets of printing paper.

The functional printing may be at least one printing among a toner line printing for adjusting the toner concentration, a toner line printing for preventing a cleaning blade of a photosensitive medium from being turned over, a toner line printing for preventing a cleaning blade of a transfer belt from being turned over, and a printing for discharging a heated and pressurized toner.

The supplying the printing paper after a preset delay time may delay an operation start time of at least one clutch among a pick-up clutch, a registration clutch, and a feed clutch to have a longer interval between the sheets of printing paper than the predetermined interval.

The predetermined interval between the sheets of printing paper may be 1 to 1.4 times of the circumference of the transfer roller.

The performing a functional printing may form a toner line in the interval section between the sheets of printing paper.

The performing a functional printing may apply to a transferring unit an identical polarity voltage to that of the toner when the toner line passes by the transferring unit.

The performing a functional printing may apply to the transferring unit an opposite polarity voltage compared to a voltage applied to the transferring unit after the toner line passes by the transferring unit and a predetermined time is passed.

The performing a functional printing may apply to the transferring unit an opposite polarity and an identical polarity, alternately, to that of a voltage applied to the transferring unit after the toner line passes by the transferring unit and a predetermined time is passed.

BRIEF DESCRIPTION OF THE DRAWINGS

These together with other aspects and advantages which will be subsequently apparent, reside in the details of construction and operation as more fully hereinafter described and claimed, reference being had to the accompanying drawings forming a part hereof, wherein like numerals refer to like parts throughout in which:

DETAILED DESCRIPTION

Figure 1:
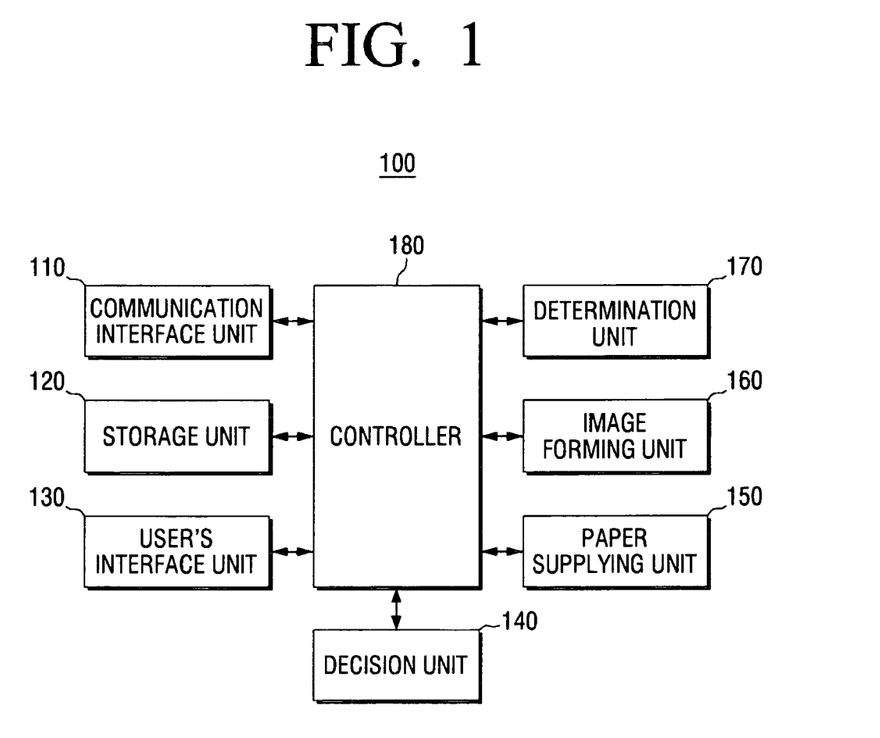
FIG. 1 illustrates an image forming apparatus according to an exemplary embodiment.

FIG. 1 illustrates illustrating an image forming apparatus according to an exemplary embodiment.

With reference to FIG. 1, an image forming apparatus 100 includes a communication interface unit 110, a storage unit 120, a user's interface unit 130, a decision unit 140, a paper supplying unit 150, an image forming unit 160, a determination unit 170, and a controller 180.

The communication interface unit 110 may be connected to a printing control terminal apparatus (not shown) such as a PC, a laptop, a PDA or a digital camera etc. The communication interface unit 110 connects the image forming apparatus 100 to an external apparatus and may be connected to a printing control terminal apparatus (not shown) through a Local Area Network (LAN), an internet network, or a Universal Serial Bus (USB) port in a wired manner and/or a wireless manner.

The communication interface unit 110 receives a printing data from the printing control terminal apparatus. The printing data may be a Printer Command Language (PCL) produced from the printer driver of the printing control terminal apparatus, a Page Description Language (PDL) data written in PostScript (PS) language, a Graphic Device Interface (GDI) data, or an XPS file, etc. In the exemplary embodiment, the printing data is received from the printing control terminal apparatus but the files may be directly transmitted to the image forming apparatus.

The storage unit 120 stores the printing data. The storage unit 120 stores the printing data received through the communication interface unit 110. The storage unit 120 may be a storage medium inside the image forming apparatus 100 or an external storage medium such as a removable disk including the USB memory, and a web server through the network. Storage unit 120 may include a data storage memory and a command processing memory.

The user's interface unit 130 includes a plurality of functional keys for the user's setting or selection of various functions supported in the image forming apparatus 100, and displays various information provided in the image forming apparatus 100. The user's interface unit 130 may be a simultaneous input/output device like a touch pad or a device integrating functions of a mouse and a monitor. The user may select a desired operation by using the user's interface window provided through the user's interface unit 130.

The decision unit 140 decides the printing speed related to the image forming of the printing data. The decision unit 140 may decide the printing speed related to the image forming in consideration of the types of the sheets of printing paper (i.e. time required for the fixing operation) and the printing engine speed. The decision unit 140 may decide the interval distance and the supplying speed between the sheets of printing paper based on the decided printing speed. An interval between the sheets of printing paper may be defined as a distance between the sheets of printing paper.

The paper supplying unit 150 supplies the sheets of printing paper to the image forming unit 160 along with a paper supplying route. The paper supplying unit 150 provides the sheets of printing paper to the image forming unit 160 in accordance with the printing speed and the interval distance between the sheets of printing paper decided by the decision unit 140 by using a pick-up clutch supplying the sheets of printing paper from the printing paper tray onto a paper supplying route, a registration clutch supplying the sheets of printing paper to the image forming unit 160, and a feed clutch supplying the sheets of printing paper from the pick-up clutch to the registration clutch.

The paper supplying unit 150 may delay the supply of the sheets of printing paper to the image forming unit 160 in accordance with the determination result of the after-mentioned determination unit 170 or the control of the controller

180. The paper supplying unit 150 delays the operation start time of at least one clutch among the pick-up clutch, the registration clutch, and the feed clutch to make a longer interval distance between the sheets of printing paper than a predetermined distance.

The image forming unit 160 forms an image on a printing paper based on the printing data. The image forming unit 160 may perform an ordinary printing operation for the printing data received through the communication interface unit 110 by using a photosensitive medium, an exposing unit, a developing unit, and a transferring unit Image forming unit 160 is described referring to FIG. 2. An "ordinary printing" may be defined as a normal printing operation to form an image on the printing paper.

The image forming unit 160 may also perform a functional printing. A "functional printing" may be defined as a printing operation carried out in the interval section between the sheets of printing paper such as a toner line printing for adjusting the concentration of the toner, a toner line printing for preventing a cleaning blade of a photosensitive medium from being turned over, a toner line printing for preventing a cleaning blade of a transfer belt from being turned over or a printing for discharging the heated and pressurized toner. An exemplary operation of functional printing will be described in detail later with reference to FIGS. 2 to 6.

The determination unit 170 determines whether a functional printing is required. The determination unit 170 determines that a functional printing is required for adjusting the concentration of the toner if a new cartridge is installed and its concentration adjustment is needed. The determination unit 170 counts the printing frequency for each printing areas. If the counted frequency exceeds a predetermined number, the determination unit 170 determines that a functional printing is required to prevent the cleaning blade of the photosensitive medium or the cleaning blade of the transfer belt from being turned over. If it is determined that the toner overheats in the transferring unit, the determination unit 170 determines that a functional printing is required for discharging the heated toner. The exemplary embodiment may be applied to various printing operations performed in an interval section between the sheets of printing paper.

When a functional printing is required, the determination unit 170 determines whether the functional printing may be performed in the interval section between the sheets of printing paper on the paper supplying route. Since the functional printing is a printing operation using a toner, the toner may contaminate the transferring unit during the functional printing process. Accordingly, in order to carry out the functional printing without any contamination on the transferring unit, a sufficient interval distance between the sheets of printing paper is needed. Therefore, the determination unit 170 determines whether the present interval distance between the sheets of printing paper exceeds a predetermined distance established to perform the functional printing, for example 1 to 1.4 times (1.3 times) of the circumference of the transfer roller.

The controller 180 controls the respective components inside the image forming apparatus 100. When the printing data is received from the printing control terminal apparatus, the controller 180 controls the image forming unit 160 to print the received printing data on a printing paper, and controls the paper supplying unit 150 to supply the sheets of printing paper to the image forming unit 160. If the determination unit 170 determines that a functional printing is required and the functional printing may be performed in an interval section between the sheets of printing paper on the paper supplying route, the controller 180 controls the image forming unit 160 to perform the functional printing in the interval section between the sheets of printing paper.

Upon determining that the functional printing may not be performed in the interval section between the sheets of printing paper, the controller 180 controls the paper supplying unit 150 to obtain a predetermined interval section between the sheets of printing paper for the functional printing by delaying the supply of the sheets of printing paper.

If the functional printing is required, the image forming apparatus 100 according to an exemplary embodiment provides the sheets of printing paper in a sufficient interval distance between the sheets of printing paper so as to prevent any contamination due to the functional printing and to improve the printing quality thereby.

Figure 2:
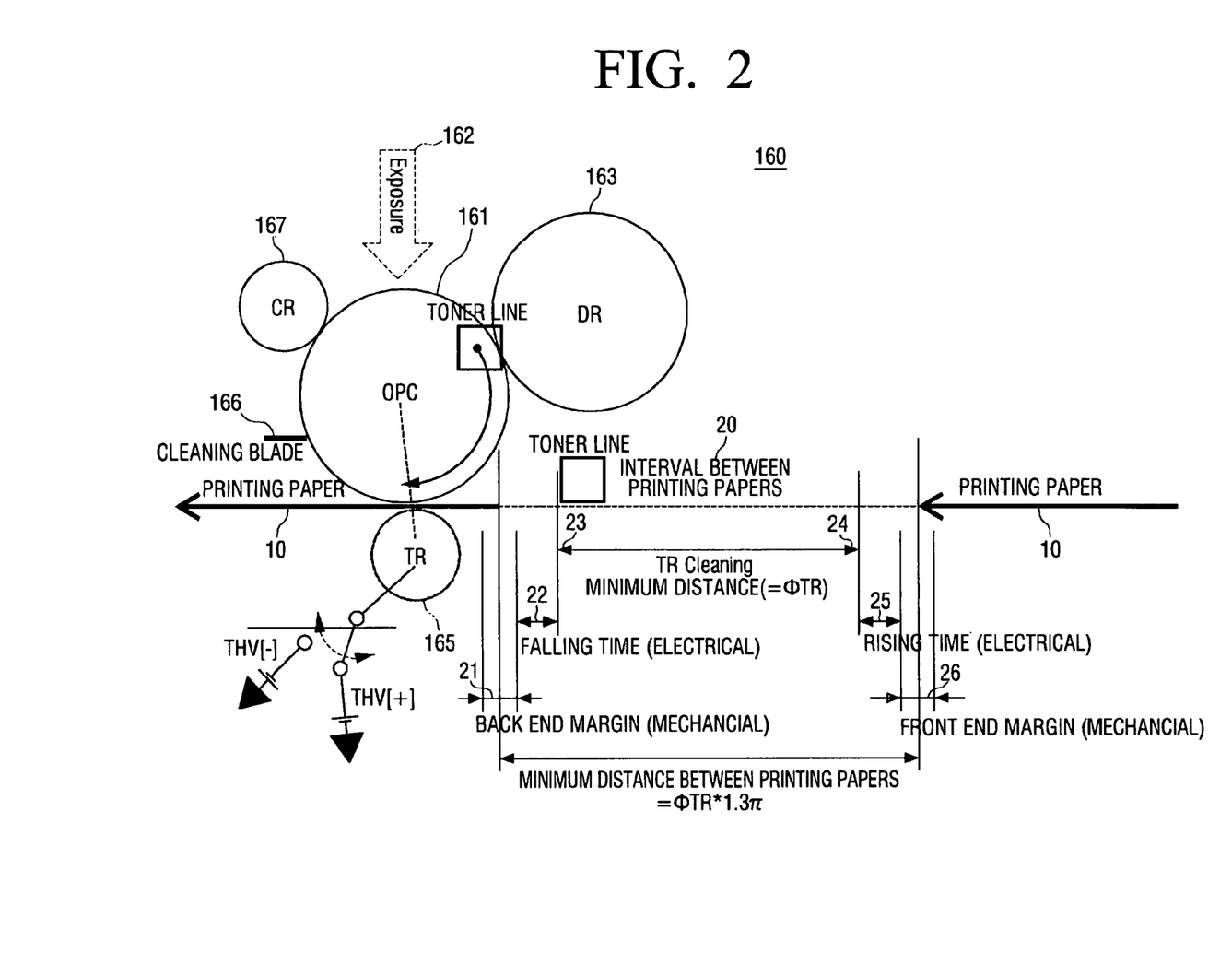
FIG. 2 illustrates an image forming unit.

FIG. 2 illustrates an image forming unit.

With reference to FIG. 2, the image forming unit 160 includes a photosensitive medium 161, an exposing unit 162, a developing unit 163, a transferring unit 165, a cleaning blade 166, and a charging unit 167.

The photosensitive medium 161 may be formed at one side thereof with an electrostatic latent image by light emitted from the exposing unit 162.

The exposing unit 162 forms an electrostatic latent image corresponding to the printing data on the photosensitive medium 161. The exposing unit 162 may form an electrostatic latent image by emitting light onto the photosensitive medium 161 electrically charged with a predetermined electric potential.

The developing unit 163 develops the electrostatic latent image as a developing material. The developing unit 163 may develop a developing material, for example a toner, on the photosensitive medium 161 formed with the electrostatic latent image.

The transferring unit 165 transfers the developed developing material onto the printing paper. The transferring unit 165 may supply the toner developed on the photosensitive medium 161 onto the printing paper 10.

The cleaning blade 166 removes the toner remained on the photosensitive medium 161 after being passed by the transferring unit 165. The charging unit 167 charges the photosensitive medium 161 to a predetermined electric potential.

An example of the operation of the functional printing will be described with reference to FIG. 2. The functional printing may be performed in the interval section 20 between the sheets of printing paper. Because the functional printing may be performed in the interval section between the sheets of printing paper, the toner developed on the photosensitive medium 161 may contaminate the transferring unit 165. During the printing process, if the transferring unit 165 pulls the toner developed on the photosensitive medium 161 due to a different polarity from the polarity of the toner in the interval section between the sheets of printing paper, the toner is delivered directly to the transferring unit 165 and may stain the transferring unit 165.

Accordingly, during the functional printing process, the transferring unit 165 may be prevented from being contaminated by obtaining an identical polarity voltage (e.g., a transferring voltage THV) to that of the toner while the toner line formed from the developing unit passes by the transferring unit 165.

In FIG. 2, the toner line is formed in a short interval section, however the toner line for preventing the wear-out of the cleaning blade of the photosensitive medium requires a sufficient toner to prevent the wear and tear of the cleaning blade. Accordingly, a cleaning operation for the transferring unit 165 should be kept during one rolling (e.g., 23 to 24) of the transfer roller.

In order to perform the aforementioned cleaning operation, voltage moving time (22 and 25) of the transferring unit 165 may additionally be required. Furthermore, when a delay occurs for a paper return, the front end margin and the back end margin of the paper may be easily turned over and thus, the mechanical margins (21 and 26) are also required.

The interval distance between the sheets of printing paper required for cleaning the surface of the transfer roller may be, for example, 1.3 times of the circumference of the transfer roller in consideration of the front and the back end margins of the paper and the delay of the high pressure rising/polling etc.

The cleaning time may be kept during 3 to 4 rollings of the transfer roller. However, if the cleaning time increases, the photosensitive medium contacting with the transfer roller simultaneously rotates and thus, the life of the photosensitive medium may be shortened. Accordingly, the cleaning during the interval may be 1 to 1.4 times (, e.g., 1.3 times) of the circumference of the transfer roller as described above.

Figure 3:
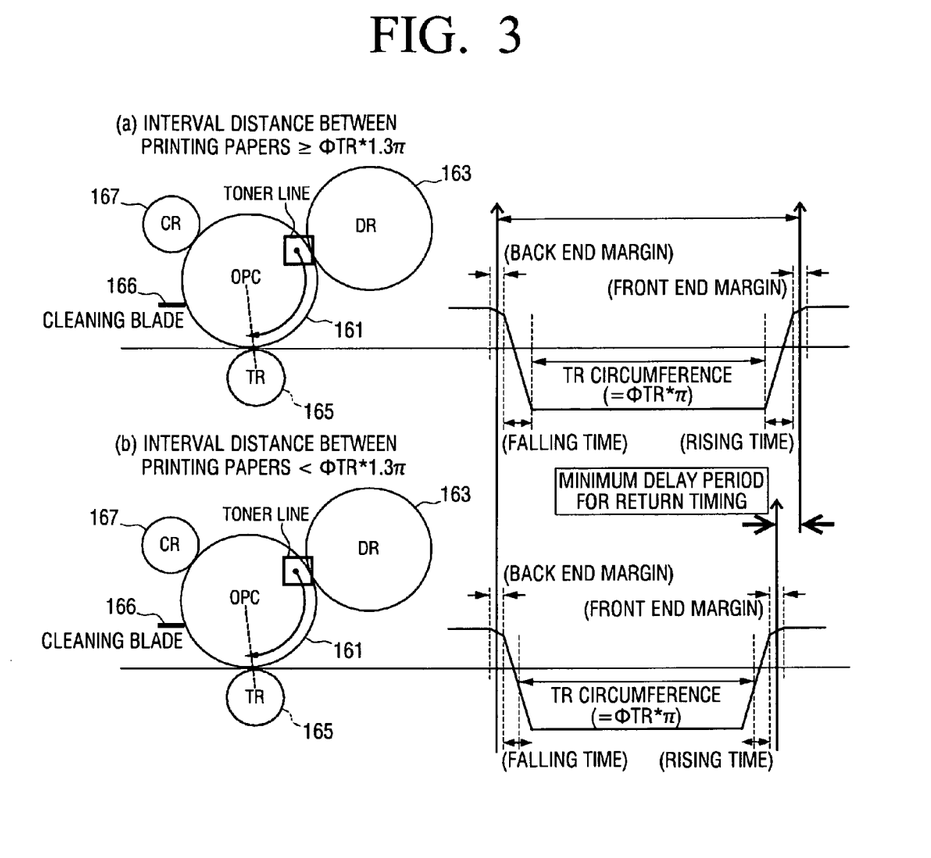
FIG. 3 illustrates an exemplary operation of forming a toner line during a functional printing to prevent a cleaning blade of a photosensitive medium from being turned over in an interval section between the sheets of printing paper according to an exemplary embodiment.

With reference to FIG. 3, the operation of the functional printing is described for obtaining a sufficient interval between the sheets of printing paper and having no interval between the sheets of printing paper.

FIG. 3 illustrates an operation of forming a toner line during a functional printing to prevent a cleaning blade of a photosensitive medium from being turned over in an interval section between the sheets of printing paper according to an exemplary embodiment.

In order the toner line which prevents the cleaning blade from being turned over to move to the contact portion of the cleaning blade 166 and perform as a lubricant of the cleaning blade, most portions of the toner line should pass by the transfer nip. That is, to minimize the movement of the toner line which is formed during the interval between the sheets of printing paper, towards the transfer roller, an identical (−) polarity bias to that of the toner line should be applied to the transfer roller. The exemplary embodiment discloses a toner having a negative polarity, however the transferring unit 165 may convert the existing positive polarity used to perform the transferring operation to a negative polarity.

As the high pressure of the negative polarity bias increases, less portion of the toner line move towards the transfer roller, therefore the toner line forming time is generally controlled in consideration of the high pressure polling time.

If a sufficient interval is obtained between the sheets of printing paper as shown in the upper part (a) of FIG. 3, the toner line may be controlled to pass by the transfer nip while the negative bias is stabilized, thereby enabling to effectively prevent the cleaning blade from being turned over and remarkably reduce the contamination on the surface of the transfer roller due to the toner line.

If the interval section between the sheets of printing paper is not set in consideration of the front end margin and the back end margin of the paper and the high pressure rising/polling delay as shown in the lower part (b) of FIG. 3, the voltage rising and polling may be insufficiently made, therefore the paper supply should be delayed.

Accordingly, the determination unit 170 determines whether the current interval section between the sheets of printing paper possesses a predetermined distance, and if not, the controller 180 may control the paper supplying unit 150 to acquire a predetermined interval between the sheets of printing paper for a functional printing by delaying the supply of the sheets of printing paper.

The controller 180 may delay the operation start time of the registration clutch supplying the sheets of printing paper to the image forming unit so as to delay the supply of the sheets of printing paper to the image forming unit 160.

The controller 180 may also delay the operation start time of the pick-up clutch supplying the sheets of printing paper of the printing paper tray onto the paper supplying route so as to delay the supply of the sheets of printing paper to the image forming unit 160.

The controller 180 may also delay the operation start time of the feed clutch supplying the sheets of printing paper from the pick-up clutch to the registration clutch so as to delay the supply of the sheets of printing paper to the image forming unit 160.

Figure 4:
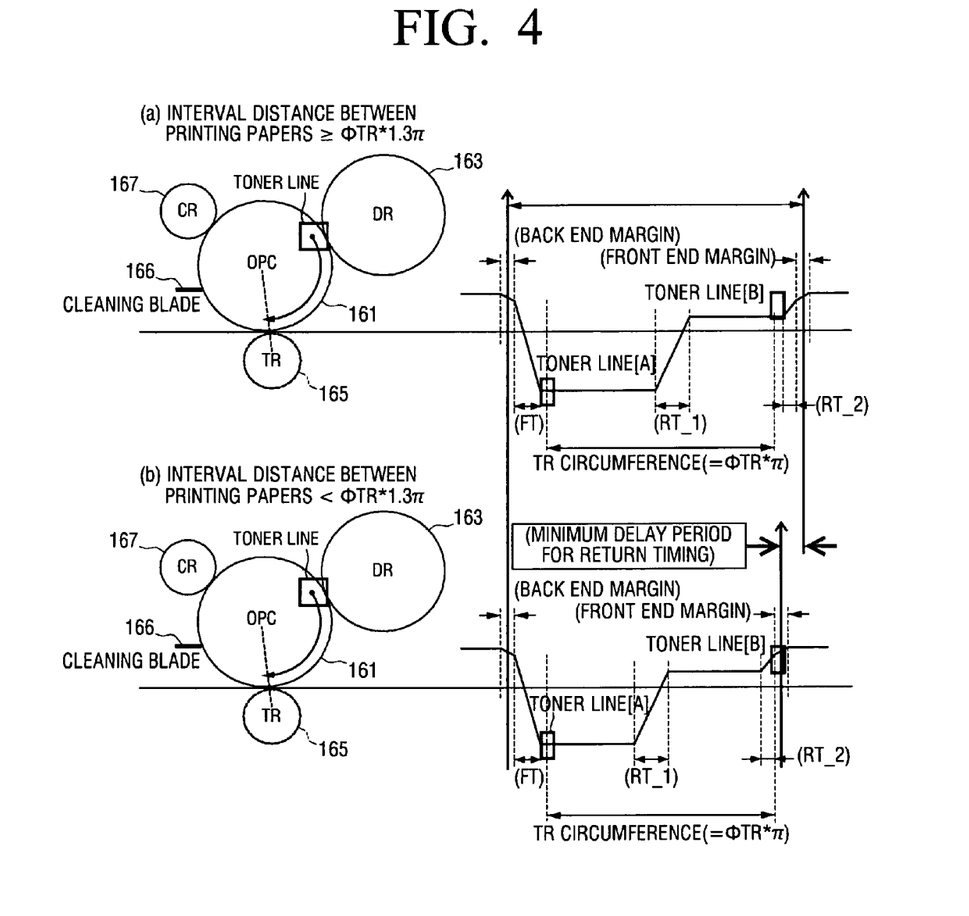
FIG. 4 illustrates an operation of forming a toner line during a functional printing to prevent a cleaning blade of a photosensitive medium from being turned over in an interval section between the sheets of printing paper according to an exemplary embodiment.

FIG. 4 illustrates an operation of forming a toner line during a functional printing to prevent a cleaning blade of a photosensitive medium from being turned over in an interval section between the sheets of printing paper according to an exemplary embodiment.

The developing material (or a toner) may have a predetermined straight polarity, and the straight polarity of the developing material is a negative polarity in an exemplary embodiment. Accordingly, most of the polarity of the toner particles including the toner line become negative. However, the toner particles having a positive polarity also exist in the developing material. Therefore, if a large amount of the toner particles having the reverse (+) polarity exists, a positive polarity bias identical in polarity to that of the toner particle having the reverse polarity is required to be applied to the transfer roller within one rotation cycle of the transfer roller.

In FIG. 4, the toner line (A) is a toner line of a straight (−) polarity moving towards the cleaning blade, and the toner line (B) is a toner line of a reverse (+) polarity pre-contaminated the surface of the transfer roller returned to the photosensitive medium.

When the toner line of the photosensitive medium passes by a transfer nip, a negative polarity identical to the straight polarity of the toner line is applied to the transfer roller 165, therefore, most portions of the toner line are supplied to the cleaning blade 166 without contaminating the transfer roller.

However, the reverse (+) polarity toner inside the toner line is affixed on the surface of the transfer roller having an opposite polarity and contaminates the transfer roller. If the amount of the toner having a reverse polarity is remarkably high, the amount of the toner having the reverse polarity increases and stains the surface of the transfer roller increases in accordance with the increase of the amount of the negative bias.

Accordingly, when a large amount of the toner having a reverse polarity is attached on the surface of the transfer roller and re-passes by a transfer nip (=when the transfer roller makes one rotation after the toner line passes by the transfer nip), the transferring unit 165 is applied with the positive polarity to remove the positive toner and clean the surface of the transfer roller.

Accordingly, the controller 180 may apply to the transferring unit 165 an identical polarity voltage to that of the toner while the toner line passes by the transferring unit. The controller 180 may apply to the transferring unit 165 an opposite polarity voltage compared to the voltage applied to the transferring unit 165, after the toner line passes by the transferring unit 165 and a predetermined time is passed.

With reference to FIG. 4, the exemplary embodiment discloses that a bias voltage is changed only once after a predetermined time period is passed, however, may be embodied to apply to the transferring unit 165, alternately, an opposite polarity and an identical polarity to that of the voltage applied to the transferring unit 165 after a predetermined time period is passed.

If a sufficient interval is obtained between the sheets of printing paper as shown in the upper portion (a) of FIG. 4, the changed bias voltage may be applied to the transfer roller so as to allow the toner line (B) to clean on the transfer roller. However, if an insufficient interval is obtained between the sheets of printing paper as shown in the lower portion (b) of FIG. 4, a rising time margin of a high pressure may be narrowed down.

Accordingly, the determination unit 170 determines whether the current interval section between the sheets of printing paper has a predetermined distance, and if not, the controller 180 may control the paper supplying unit 150 to obtain a predetermined interval between the sheets of printing paper for the functional printing by delaying the supply of the sheets of printing paper.

The aforesaid operations are not limited to a mono engine, but may be applied in a color engine by obtaining a minimum interval between the sheets of printing paper using a timing control of the paper return.

Figure 5:
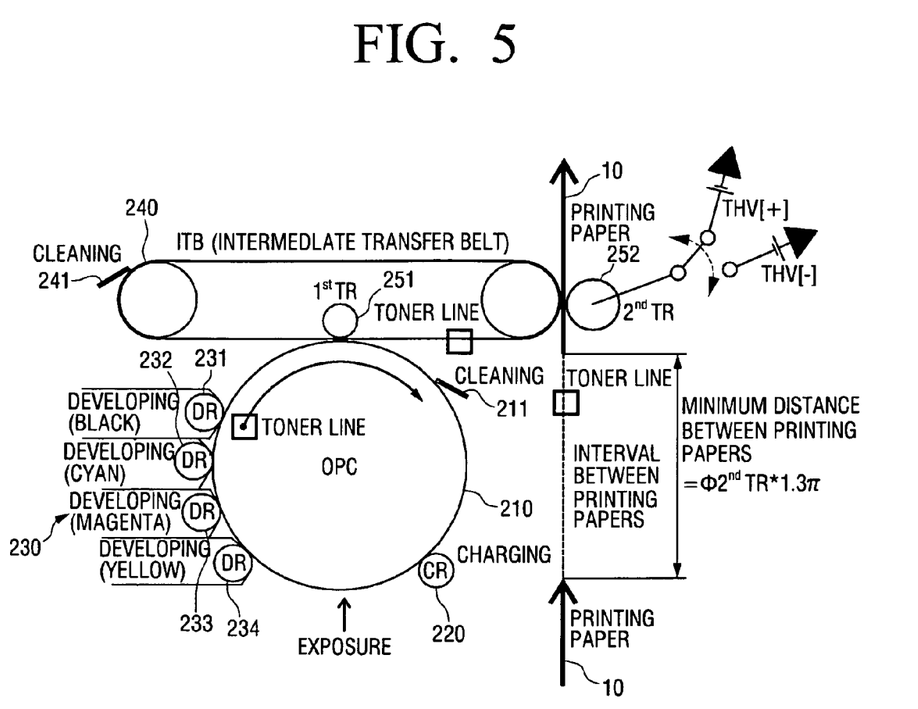
FIG. 5 illustrates an exemplary embodiment applied in a multi-pass manner.
Figure 6:
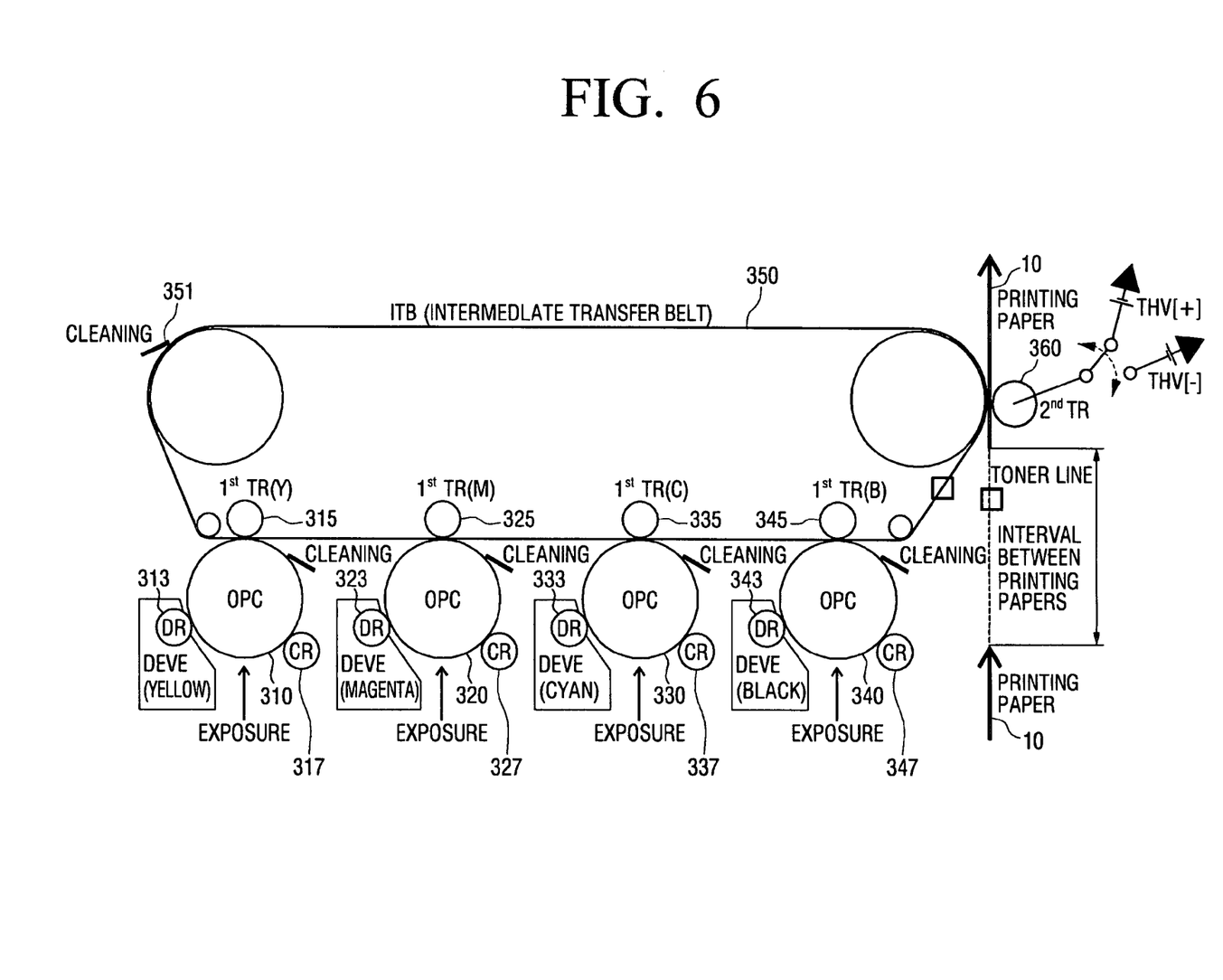
FIG. 6 illustrates an exemplary embodiment applied with an image forming apparatus in a tandem manner.

With reference to FIGS. 5 and 6, an operation of an exemplary embodiment in a color engine is described.

FIG. 5 illustrates an exemplary embodiment applied in a multi-pass manner.

In a color image forming apparatus of a multi-pass manner, the toner image may be consecutively transferred on an intermediate transfer belt (ITB) 240 via a nip of a first transferring unit 251. The apparatus includes cleaning blade 241. The toner image is transferred again from a nip of a second transferring unit 252 to the printing paper.

The intermediate transfer belt cleaning blade protective line which is formed on the intermediate transfer belt in the interval section between the sheets of printing paper may be selectively formed in one or more developing units (230, 231, 232, 233, and 234) having a sufficient amount of the toner, however should have the same feature as the mono image forming apparatus in that the protective line is formed in the interval section between the sheets of printing paper.

Accordingly, the color image forming apparatus of the multi-pass manner determines whether the current interval section between the sheets of printing paper possesses an a predetermined distance, and if not, the controller 180 may control the paper supplying unit 150 to obtain a predetermined interval between the sheets of printing paper for the functional printing by delaying the supply of the sheets of printing paper.

FIG. 6 illustrates an exemplary embodiment applied with an image forming apparatus of a tandem manner.

The image forming apparatus of the tandem manner includes photosensitive mediums (310, 320, 330, and 340) plurality of first transferring units (315, 325, 335, and 345) and developer units (313, 323, 333, and 343) and has an identical system to that of the aforesaid image forming apparatus in that a protective line may pass by the nip of a second transferring unit 360 and contaminate the surface of a second transfer roller in the interval section between the sheets of printing paper. The apparatus includes cleaning blade 351.

Accordingly, a color image forming apparatus of the tandem manner determines whether the current interval section between the sheets of printing paper has a predetermined distance, and if not, the controller 180 may control the paper supplying unit 150 to obtain a predetermined interval between the sheets of printing paper for the functional printing by delaying the supply of the sheets of printing paper.

Figure 7:
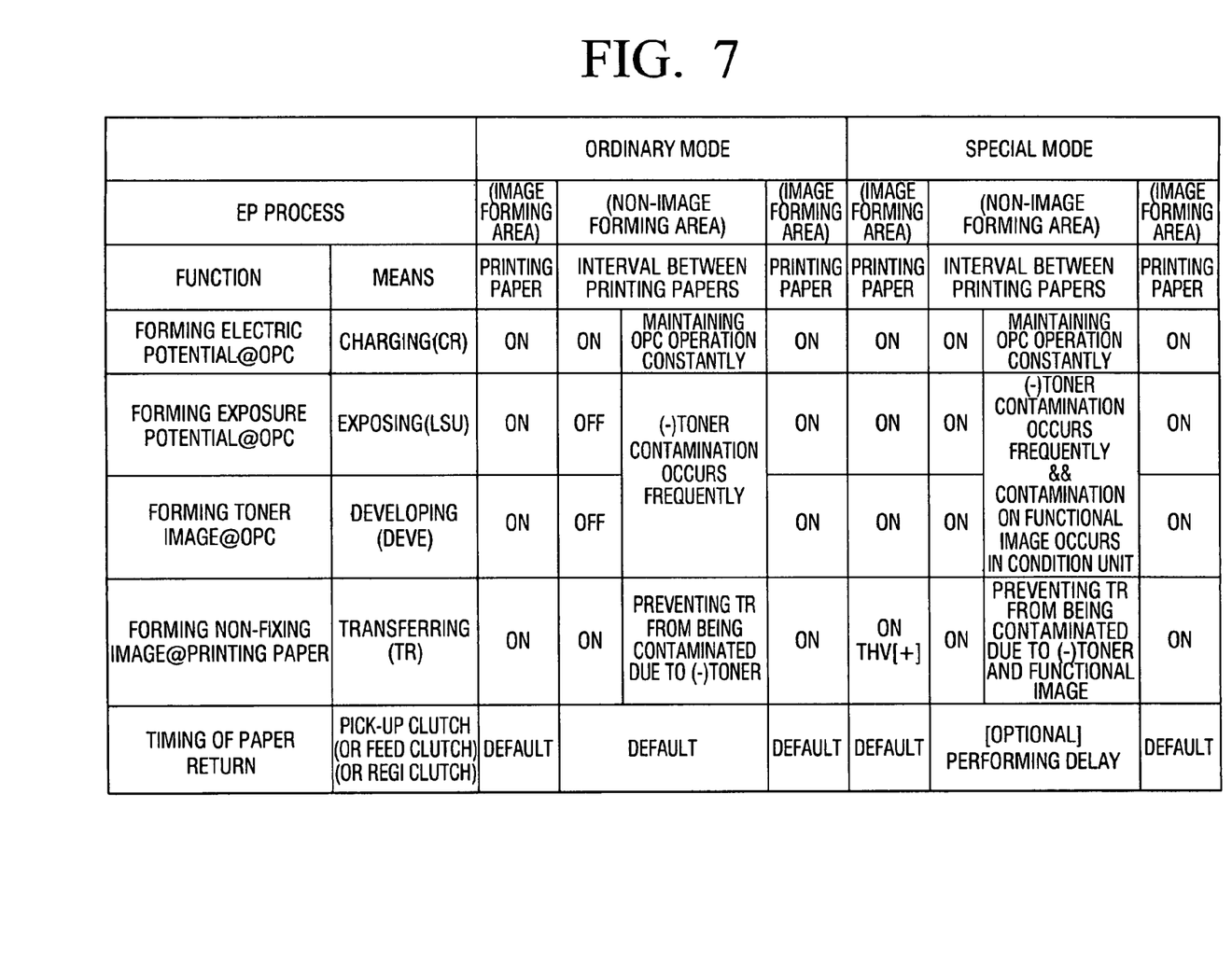
FIG. 7 illustrates operations of an image forming unit for an ordinary printing operation and a functional printing operation of an exemplary embodiment.

FIG. 7 depicts the operation features of the image forming unit for an ordinary printing operation and a functional printing operation of an exemplary embodiment.

With reference to FIG. 7, in a normal mode of the ordinary printing operation, the exposing unit and the developing unit are inactivated during the non-image forming section. However, in a special mode of a functional printing operation, the exposing unit and the developing unit are not activated to form a toner line during the non-image forming section.

In FIG. 7, a toner charged in a negative potential is used but, the exemplary embodiment may be used in the system employing a toner having a positive potential, wherein the polarities illustrated in FIG. 7 may be opposed.

Figure 8:
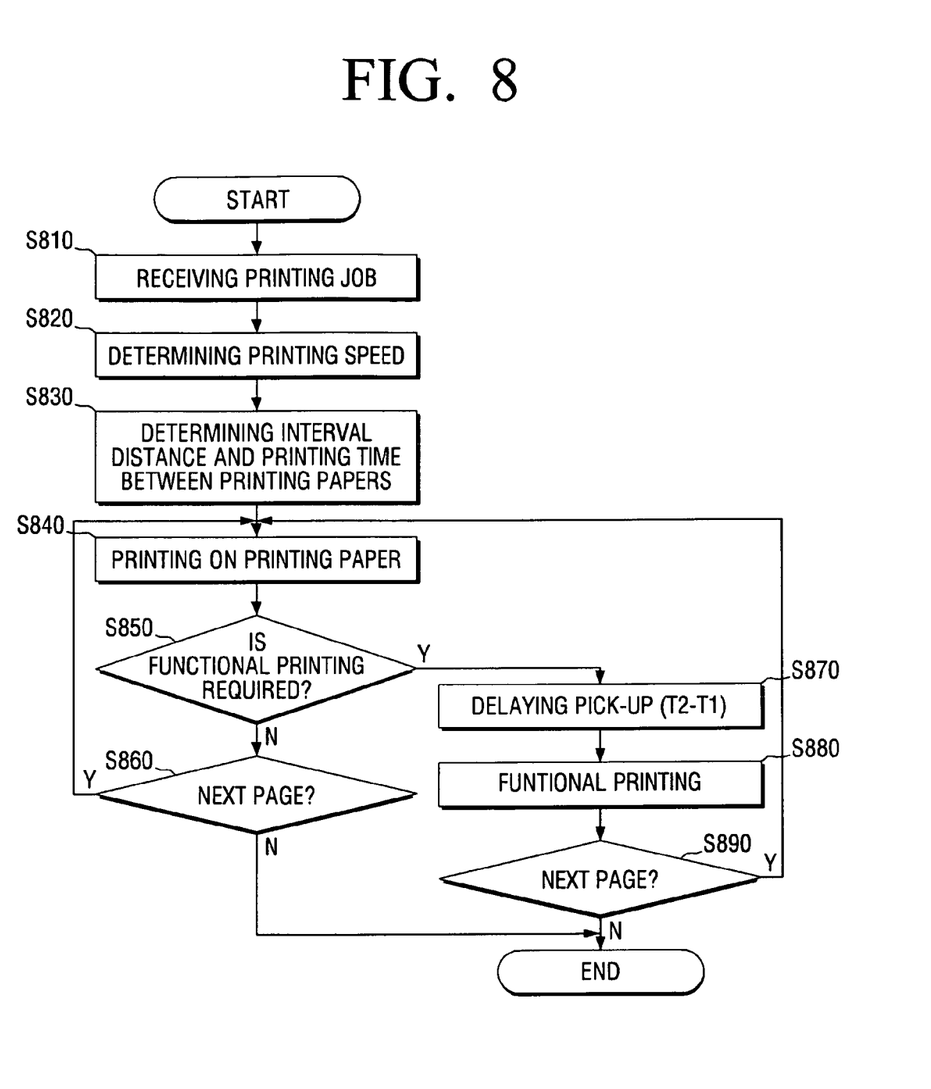
FIG. 8 illustrates an image forming method according to an exemplary embodiment.

FIG. 8 is a flowchart depicting an image forming method according to an exemplary embodiment.

In reference to FIG. 8, when a printing data is received (S810), the printing speed related to the image forming is decided (S820). The printing speed may be decided in consideration of the types of the sheets of printing paper (i.e. time required for the fixing operation), and the speed of the printing engine etc.

The interval distance and the supplying speed between the sheets of printing paper may be decided based on the decided printing speed (S830).

The printing operation for the printing data is carried out according to the decided printing speed, the interval distance, and the supplying speed between the sheets of printing paper (S840). The printing operation described above is the ordinary printing operation and the detailed description thereof is omitted.

During the printing process, it is determined whether a functional printing is required (S850). For example, a functional printing is required, if a new cartridge is installed and its concentration adjustment is required, if a cleaning blade of the photosensitive medium or a cleaning blade of the transfer belt needs to be prevented from being turned over, or if a printing operation to discharge the toner is required.

If a functional printing is not required as a result of the determination (S850-N), the printing operation may be continued to the next paper (S860-Y).

However, if a functional printing is required, it is determined whether a functional printing can be performed in the interval section between the sheets of printing paper on the paper supplying route. If the functional printing can be performed in the interval section between the sheets of printing paper as a result of the determination, a functional printing is operated immediately (S880).

However, if the functional printing cannot be performed in the interval section between the sheets of printing paper, the supply of the sheets of printing paper is delayed to guarantee the required minimum distance, for example 1 to 1.4 times (1.3 times) of the circumference of the transfer roller, to avoid contamination on the transferring unit (S870), and then a functional printing is carried out (S880).

After the functional printing operation is executed, the printing operation may be continued onto the next page (S890).

Accordingly, the image forming method according to an exemplary embodiment delays the supply of the sheets of printing paper, if a functional printing is required, to obtain an internal distance between the sheets of printing paper for preventing any contamination due to the functional printing, thereby improving the quality of the printing. The image forming method of FIG. 8 may be performed by an image forming apparatus of FIG. 1 or other image forming apparatuses having different structures.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:
   a communication interface unit that receives printing data;
   an image forming unit that performs an ordinary printing to form an image on one or more sheets of printing paper based on the printing data;
   a paper supplying unit that supplies the one or more sheets of printing paper to the image forming unit along with a paper supplying route;
   a determination unit that determines whether a functional printing can be performed on the paper supplying route in an interval section between the sheets of printing paper; and
   a controller that controls the image forming unit to perform a functional printing, if it is determined that a functional printing is required,
   wherein the ordinary printing is a printing performed on one or more sheets of printing paper, and the functional printing is a printing performed in an interval section between the one or more sheets of printing paper, and the controller controls the paper supplying unit to obtain a predetermined interval between the one or more sheets of printing paper for a functional printing by delaying the supply of the one or more sheets of printing paper, if it is determined that the functional printing cannot be performed in the interval section between the one or more sheets of the printing paper,
   wherein the functional printing is at least one printing among a toner line printing for adjusting a toner concentration, a toner line printing for preventing a cleaning blade of a photosensitive medium from being turned over, a toner line printing for preventing a cleaning blade of a transfer belt from being turned over, and a printing for discharging a heated and pressurized toner.

2. The apparatus as claimed in claim 1, wherein the paper supplying unit comprises:
   a pick-up clutch that supplies a sheet of printing paper from a printing paper tray onto the paper supplying route;
   a registration clutch that supplies the sheet of printing paper to the image forming unit; and
   a feed clutch that supplies the sheet of printing paper from the pick-up clutch to the registration clutch, wherein
   the controller delays an operation start time of at least one clutch among the pick-up clutch, the registration clutch, and the feed clutch to obtain a longer interval between the sheets of printing papers than a predetermined interval.

3. An image forming apparatus, comprising:
   a communication interface unit that receives printing data;
   an image forming unit that performs an ordinary printing to form an image on one or more sheets of printing paper based on the printing data;
   a paper supplying unit that supplies the one or more sheets of printing paper to the image forming unit along with a paper supplying route;
   a determination unit that determines whether a functional printing can be performed on the paper supplying route in an interval section between the sheets of printing paper; and
   a controller that controls the image forming unit to perform a functional printing, if it is determined that a functional printing is required,
   wherein the ordinary printing is a printing performed on one or more sheets of printing paper, and the functional printing is a printing performed in an interval section between the one or more sheets of printing paper, and the controller controls the paper supplying unit to obtain a predetermined interval between the one or more sheets of printing paper for a functional printing by delaying the supply of the one or more sheets of printing paper, if it is determined that the functional printing cannot be performed in the interval section between the one or more sheets of the printing paper,
   wherein the paper supplying unit comprises:
   a pick-up clutch that supplies a sheet of printing paper from a printing paper tray onto the paper supplying route;
   a registration clutch that supplies the sheet of printing paper to the image forming unit; and
   a feed clutch that supplies the sheet of printing paper from the pick-up clutch to the registration clutch, wherein
   the controller delays an operation start time of at least one clutch among the pick-up clutch, the registration clutch, and the feed clutch to obtain a longer interval between the sheets of printing papers than a predetermined interval,
   wherein the predetermined interval between the sheets of printing papers is in a range of 1 to 1.4 times of the circumference of a transfer roller.

4. The apparatus as claimed in claim 1, wherein the image forming unit comprises:
   a photosensitive medium;
   an exposing unit that forms an electrostatic latent image corresponding to a printing data on the photosensitive medium;
   a developing unit that develops the electrostatic latent image as a developing material; and
   a transferring unit that transfers the developed developing material on the printing paper.

5. The apparatus as claimed in claim 4, wherein the image forming unit forms a toner line in an interval section between the sheets of printing paper, if a functional printing is required.

6. An image forming apparatus, comprising:
   a communication interface unit that receives printing data;
   an image forming unit that performs an ordinary printing to form an image on one or more sheets of printing paper based on the printing data;
   a paper supplying unit that supplies the one or more sheets of printing paper to the image forming unit along with a paper supplying route;
   a determination unit that determines whether a functional printing can be performed on the paper supplying route in an interval section between the sheets of printing paper; and
   a controller that controls the image forming unit to perform a functional printing, if it is determined that a functional printing is required,
   wherein the ordinary printing is a printing performed on one or more sheets of printing paper, and the functional printing is a printing performed in an interval section between the one or more sheets of printing paper, and the controller controls the paper supplying unit to obtain a predetermined interval between the one or more sheets of printing paper for a functional printing by delaying the supply of the one or more sheets of printing paper, if it is determined that the functional printing cannot be performed in the interval section between the one or more sheets of the printing paper,
   wherein the image forming unit comprises:
   a photosensitive medium;

an exposing unit that forms an electrostatic latent image corresponding to a printing data on the photosensitive medium;

a developing unit that develops the electrostatic latent image as a developing material; and a transferring unit that transfers the developed developing material on the printing paper, wherein the image forming unit forms a toner line in an interval section between the sheets of printing paper, if a functional printing is required, wherein the controller applies to the transferring unit an identical polarity voltage to that of the toner when the toner line passes by the transferring unit.

7. The apparatus as claimed in claim 6, wherein the controller applies to the transferring unit an opposite polarity voltage compared to a voltage applied to the transferring unit after the toner line passes by the transferring unit and a predetermined time is passed.

8. The apparatus as claimed in claim 6, wherein the controller applies to the transferring unit an opposite polarity and an identical polarity, alternately, to that of the voltage applied to the transferring unit after the toner line passes by the transferring unit and a predetermined time is passed.

9. An image forming apparatus, comprising:

a communication interface unit that receives printing data;

an image forming unit that performs an ordinary printing to form an image on one or more sheets of printing paper based on the printing data;

a paper supplying unit that supplies the one or more sheets of printing paper to the image forming unit along with a paper supplying route;

a determination unit that determines whether a functional printing can be performed on the paper supplying route in an interval section between the sheets of printing paper; and a controller that controls the image forming unit to perform a functional printing, if it is determined that a functional printing is required, wherein the ordinary printing is a printing performed on one or more sheets of printing paper, and the functional printing is a printing performed in an interval section between the one or more sheets of printing paper, and the controller controls the paper supplying unit to obtain a predetermined interval between the one or more sheets of printing paper for a functional printing by delaying the supply of the one or more sheets of printing paper, if it is determined that the functional printing cannot be performed in the interval section between the one or more sheets of the printing paper, wherein the image forming unit comprises:

a photosensitive medium;

an exposing unit that forms an electrostatic latent image corresponding to a printing data on the photosensitive medium;

a developing unit that develops the electrostatic latent image as a developing material; and a transferring unit that transfers the developed developing material on the printing paper, wherein the exposing unit and the developing unit are inactivated in the interval section between the sheets of printing paper, if a functional printing is not required, and maintain the activation in the interval section between the sheets of printing paper, if a functional printing is required.

10. An image forming method of an image forming apparatus, comprising:

receiving a printing data;

performing an ordinary printing to form an image on one or more sheets of printing paper based on the printing data;

determining whether a functional printing can be performed on a paper supplying route in an interval section between the sheets of printing paper;

supplying the sheets of printing paper after a preset delay time to obtain a predetermined interval between the sheets of printing paper for the functional printing; and performing a functional printing on the paper supplying route in the interval section between the sheets of printing paper, wherein the ordinary printing is a printing performed on one or more sheets of printing paper, and the functional printing is a printing performed in an interval section between the sheets of printing paper, wherein the functional printing is at least one printing among a toner line printing for adjusting the toner concentration, a toner line printing for preventing a cleaning blade of a photosensitive medium from being turned over, a toner line printing for preventing a cleaning blade of a transfer belt from being turned over, and a printing for discharging a heated and pressurized toner.

11. The method as claimed in claim 10, wherein the supplying the printing paper after a preset delay time delays an operation start time of at least one clutch among a pick-up clutch, a registration clutch, and a feed clutch to have a longer interval between the sheets of printing paper than the predetermined interval.

12. An image forming method of an image forming apparatus, comprising: receiving a printing data;

performing an ordinary printing to form an image on one or more sheets of printing paper based on the printing data;

determining whether a functional printing can be performed on a paper supplying route in an interval section between the sheets of printing paper;

supplying the sheets of printing paper after a preset delay time to obtain a predetermined interval between the sheets of printing paper for the functional printing; and performing a functional printing on the paper supplying route in the interval section between the sheets of printing paper, wherein the ordinary printing is a printing performed on one or more sheets of printing paper, and the functional printing is a printing performed in an interval section between the sheets of printing paper, wherein the supplying the printing paper after a preset delay time delays an operation start time of at least one clutch among a pick-up clutch, a registration clutch, and a feed clutch to have a longer interval between the sheets of printing paper than the predetermined interval, wherein the predetermined interval between the sheets of printing paper is 1 to 1.4 times of the circumference of a transfer roller.

13. The method as claimed in claim 10, wherein the performing a functional printing forms a toner line in the interval section between the sheets of printing paper.

14. An image forming method of an image forming apparatus, comprising:

receiving a printing data;

performing an ordinary printing to form an image on one or more sheets of printing paper based on the printing data;

determining whether a functional printing can be performed on a paper supplying route in an interval section between the sheets of printing paper;

supplying the sheets of printing paper after a preset delay time to obtain a predetermined interval between the sheets of printing paper for the functional printing; and performing a functional printing on the paper supplying route in the interval section between the sheets of printing paper, wherein the ordinary printing is a printing performed on one or more sheets of printing paper, and the functional printing is a printing performed in an interval section between the sheets of printing paper, wherein the performing a functional printing forms a toner line in the interval section between the sheets of printing paper, wherein the performing a functional printing applies to a transferring unit an identical polarity voltage to that of a toner when the toner line passes by the transferring unit.

15. The method as claimed in claim 14, wherein the performing a functional printing applies to the transferring unit an opposite polarity voltage compared to a voltage applied to the transferring unit after the toner line passes by the transferring unit and a predetermined time is passed.

16. The method as claimed in claim 14, wherein the performing a functional printing applies to the transferring unit an opposite polarity and an identical polarity, alternately, to that of the voltage applied to the transferring unit after the toner line passes by the transferring unit and a predetermined time is passed.

* * * * *